(12) United States Patent
Janocha et al.

(10) Patent No.: US 12,126,379 B2
(45) Date of Patent: Oct. 22, 2024

(54) SWIVELLING MECHANISM FOR COMMUNICATION UNITS

(71) Applicant: Tesat-Spacecom GmbH & Co. KG, Backnang (DE)

(72) Inventors: Tobias Janocha, Backnang (DE); Andreas Scheffel, Auenwald (DE); Daniel Reicherter, Stuttgart (DE)

(73) Assignee: Tesat-Spacecom GmbH & Co. KG, Backnang (DE)

( * ) Notice: Subject to any disclaimer, the term of this patent is extended or adjusted under 35 U.S.C. 154(b) by 258 days.

(21) Appl. No.: 17/575,979

(22) Filed: Jan. 14, 2022

(65) Prior Publication Data
US 2022/0239372 A1 Jul. 28, 2022

(30) Foreign Application Priority Data

Jan. 22, 2021 (DE) ...................... 10 2021 101 423.9

(51) Int. Cl.
*H04B 10/118* (2013.01)
(52) U.S. Cl.
CPC ................................. *H04B 10/118* (2013.01)
(58) Field of Classification Search
CPC .............. H04B 10/118; H04B 10/1123; H04B 10/1125; G02B 23/165; H01Q 3/08
See application file for complete search history.

(56) References Cited

U.S. PATENT DOCUMENTS

| | | | |
|---|---|---|---|
| 5,420,598 A | * | 5/1995 | Uematsu .............. H01Q 1/3275 343/765 |
| 6,259,415 B1 | | 7/2001 | Kumpfbeck et al. |

(Continued)

FOREIGN PATENT DOCUMENTS

| | | |
|---|---|---|
| DE | 102016121919 A1 | 5/2018 |
| DE | 102017127813 A1 | 5/2019 |

(Continued)

OTHER PUBLICATIONS

Barho, R. et al., "Coarse Pointing and Fine Pointing mechanism (CPA and FPA) for an optical communication link." Proceedings of the 10th European Space Mechanisms and Tribology Symposium, Sep. 2003, pp. 89-96.

(Continued)

*Primary Examiner* — Seung H Lee
(74) *Attorney, Agent, or Firm* — Lerner David LLP

(57) ABSTRACT

An optical communication unit for sending and receiving optical communication signals is described. The optical communication unit includes an optical unit, an elevation drive and an azimuth drive. The optical unit emits and/or receives optical communication signals. The elevation drive is coupled with the optical unit by way of an elevation bearing and swivels the optical unit about an elevation axis. The azimuth drive is coupled with the optical unit and the elevation drive and turns the optical unit together with the elevation drive about an azimuth axis. The elevation axis is arranged eccentrically with respect to the azimuth axis, so that the elevation axis is offset with respect to the azimuth axis by a lateral offset. This allows the optical unit to be swiveled to alongside the azimuth drive, so that a swiveling range of the optical unit is increased.

8 Claims, 3 Drawing Sheets

(56) References Cited

U.S. PATENT DOCUMENTS

| | | | |
|---|---|---|---|
| 6,535,314 B1* | 3/2003 | Mendenhall | H04B 10/118 398/121 |
| 9,912,051 B2* | 3/2018 | Sakai | H01Q 1/125 |
| 10,290,938 B1* | 5/2019 | Henneberry | H01Q 3/08 |
| 2018/0138968 A1 | 5/2018 | Auer | |
| 2019/0163030 A1 | 5/2019 | Heine | |

FOREIGN PATENT DOCUMENTS

| | | |
|---|---|---|
| JP | H08288732 A | 11/1996 |
| JP | 2806659 B2 | 9/1998 |

OTHER PUBLICATIONS

German Search Report for Application No. 102021101423.9 dated Jan. 22, 2021, pp. 1-7.
Li, H. et al., "A compact and lightweight two-dimensional gimbal for inter-satellite laser communication applications." Optics Express, Aug. 2019, pp. 24060-24071, vol. 27, No. 17.
Extended European Search Report for European Patent Application No. 21209000 dated May 11, 2022, 2 pages.
Kesner, J et al., "Compact Optical Gimbal as a conformal beam director for large field-of-regard lasercom applications", "Proceedings of SPIE, IEEE, US", Mar. 2015, pp. 93540K1-10, vol. 9354, XP060049864.

* cited by examiner

SWIVELLING MECHANISM FOR COMMUNICATION UNITS

FIELD OF THE INVENTION

The present description concerns a communication unit and its movement mechanism for a swiveling movement about an elevation axis and a turning movement about an azimuth axis. The description also concerns a communication satellite with such a communication unit.

BACKGROUND OF THE INVENTION

There has recently been an increasing proliferation of satellite constellations. A satellite constellation may be described as a group of satellites comprising a plurality of satellites, the satellites each passing around the Earth in a predetermined orbit and covering a specific area of the Earth's surface. The number of satellites in a satellite constellation and the path of the Earth orbits can be dimensioned such that at least one satellite can establish a direct optical link with any desired point on the Earth's surface and at any point in time.

With the increasing proliferation of satellite constellations in low and medium Earth orbit, the requirements for the payload carried by the satellites are shifting towards low costs and higher production volumes, which ultimately means the requirement for lower weight and reduced functional and structural complexity, while at the same time retaining the requirements for data transmission (in particular high data rates, greatest possible swiveling range and accurate adjustability of the communication units).

DE 10 2016 121 919 A1 describes a satellite constellation comprising a plurality of communication satellites and also an approach to the data transmission and routing between the individual communication satellites.

DE 10 2017 127 813 A1 describes a system and a method for adjusting a radiating direction of an optical communication signal between a communication platform and a remote station.

Communication units of a wide variety of types can be used for the transmission of data. Communication units generally use electromagnetic signals for the data transmission. Optical communication units consist for example of multiple components, which have the task of aligning and tracking the optical signal (for example by deflecting mirrors or a movement of the optical unit itself), conditioning optical signals (by an optical unit), processing data (by an electronic unit), and controlling the communication unit. However, directional antennas may also be used, the radiating and receiving direction of which can be aligned with a remote station.

Optical signals may for example be directed by multiple mirror elements, which are each able to swivel about differently arranged axes, from a remote station to the optical unit (or vice versa). Here, the optical unit itself, as a source or sink of the optical signals, is immovable, but the mirrors deflect the optical signals. This construction has the disadvantage that the mechanics are very complex and require considerable space and also have a comparatively high weight.

Another possibility is to swivel the optical unit, which may also be referred to as a telescope. However, conventional constructions have a comparatively small swiveling range of the telescope about the elevation axis.

Yet another possibility is known by the term "Coude telescope". Here, the free optical beam is directed through the elevation axis by means of a deflecting mirror and is focused outside the swiveling telescope.

BRIEF SUMMARY OF THE INVENTION

An aspect relates to providing a communication unit which is distinguished by a compact and space-saving construction and at the same time a great swiveling range about the elevation axis and a great turning range about the azimuth axis.

According to a first aspect, a communication unit for sending and receiving communication signals is provided. The communication unit has a sending/receiving unit, an elevation drive and an azimuth drive. The sending/receiving unit is designed to emit and/or receive communication signals. The elevation drive is coupled with the sending/receiving unit by way of an elevation bearing and is designed to swivel the sending/receiving unit about an elevation axis of the elevation bearing. The azimuth drive is coupled with the sending/receiving unit and the elevation drive and is designed to turn the sending/receiving unit together with the elevation drive about an azimuth axis. The elevation axis is arranged eccentrically with respect to the azimuth axis, so that the elevation axis is offset in relation to the azimuth axis by a lateral offset.

The sending/receiving unit may be for example an optical unit in the form of a telescope, which has lenses and/or mirrors and also senders and receivers for optical signals. In that case, the sending/receiving unit is referred to as an optical unit. The optical unit can implement a sending path for the sending of optical signals and a receiving path for the receiving of optical signals. In the sending path, the optical unit is supplied with signals, which are possibly processed in the optical unit, in order then to be transmitted in a cableless manner as optical signals. In the receiving path, the optical unit receives optical signals by way of a cableless transmission path, processes or modifies these signals, in order then to feed them into a signal transmission medium, where the signal fed in is transmitted in a cable-bound manner.

The sending/receiving unit may however also be designed as a directional antenna with a predeterminable sending and receiving direction, the directional antenna being able to swivel in the way described for the optical sending/receiving unit.

For purposes of illustration, in the following reference is made in particular to optical communication units with optical units. However, it is pointed out that the present description applies both to optical units and to a directional antenna or to any other sending/receiving unit with a predeterminable and directed sending and receiving direction. This means in particular that any references in the description to an optical unit and to an optical communication unit should be understood merely as an example and apply in an analogous way to communication units with other signal carriers (electromagnetic waves) in the form of, for example, directional antennas.

The elevation axis extends transversely in relation to the azimuth axis, in particular perpendicularly thereto. The elevation drive is mechanically coupled with the sending/receiving unit and serves for swiveling the sending/receiving unit about the elevation axis. The elevation drive may be for example an electrically operated motor, for example a stepping motor, which is connected to the sending/receiving unit directly or by way of a gear mechanism, in order to transfer a movement of the motor to the sending/receiving unit and to swivel the sending/receiving unit about the elevation axis.

Depending on the direction of movement of the motor or the setting of the gear mechanism, the sending/receiving unit can perform the swiveling movement about the elevation axis in both possible directions.

The azimuth drive may likewise be an electrically operated drive like the elevation drive. The azimuth drive may be designed for example as a rotary plate, which carries the elevation drive and the sending/receiving unit. The azimuth drive may in this case perform a turning movement about the azimuth axis with the aid of the electrically operated drive. During this turning movement, the sending/receiving unit and the elevation drive are guided by the movement of the rotary plate about the azimuth axis.

The azimuth drive and the elevation drive are activated by an external control, in order to approach a position which is defined by an azimuth angle and an elevation angle. This position is predetermined by the relative arrangement of a remote communication station, with which the sending/receiving unit must be aligned in order to make the sending and receiving of communication signals possible. The control of the azimuth drive and the elevation drive is not discussed any more specifically here. A person skilled in the art must revert to known mechanisms for this. What is important is that, with the structure of the communication unit described here, a great turning range about the azimuth axis and a great swiveling range about the elevation axis are made possible by a simple construction. If the communication unit is used on board a communication satellite, the sending/receiving unit may optionally be aligned with a remote station during an orbital flight of the communication satellite and kept in this orientation.

The elevation axis is laterally offset with respect to the azimuth axis. This makes it possible that, when there is a swiveling movement about the elevation axis, the sending/receiving unit can be swiveled to such an extent in the direction of the azimuth drive that the sending/receiving unit at least partially lies laterally alongside the azimuth drive. In this way it is made possible to increase a swiveling range of the sending/receiving unit about the elevation axis. Although the physical dimensions of the azimuth drive or the rotary plate consequently continue to form a natural limitation of the swiveling range about the elevation axis, the swiveling range of the sending/receiving unit about the elevation axis is increased by the lateral offset of the elevation axis with respect to the azimuth axis or the azimuth drive.

When the sending/receiving unit swivels about the elevation axis, the sending/receiving unit does not just perform a rotational movement with respect to the azimuth drive or the associated rotary plate, but the sending/receiving unit altogether performs a combined rotary and translatory movement with respect to the rotary plate of the azimuth drive, proceeding along an arc of a circle around the elevation axis. Even if the elevation axis itself does not change its position, a geometrical middle point of the sending/receiving unit performs this said combined rotary and translatory movement. In other words: while the sending/receiving unit is swiveling about the elevation axis, it undergoes a lateral offsetting movement and in this way, when the swiveling movement is continued, can swivel to alongside the rotary plate, which increases the possible swiveling range about the elevation axis.

The construction described here makes possible a turning movement about the azimuth axis of up to 360° and a swiveling movement about the elevation axis of up to 180°. Furthermore, the construction described here makes it possible in the case of an optical unit to dispense with complex movable mirror mechanics outside the sending/receiving unit, because the sending/receiving unit itself is moved and the movement of the sending/receiving unit makes possible a great swiveling range about the elevation axis and a great turning range about the azimuth axis by the arrangement described here of the elevation axis with respect to the azimuth axis.

In one embodiment, the elevation bearing is connected to a housing of the sending/receiving unit and the elevation axis is arranged eccentrically with respect to a central axis of the housing.

The sending/receiving unit has a housing in which optical and/or electrical components which emit and receive the communication signals are arranged. The communication signals leave a housing through an inlet/outlet opening or pass through the inlet/outlet opening into the housing and then impinge on the corresponding components. When the sending/receiving unit is swiveled about the elevation axis and/or is turned about the azimuth axis, the respective movement or else combined swiveling/turning movement affects the entire housing of the sending/receiving unit. Accordingly, the elevation bearing is mechanically connected to the housing of the sending/receiving unit. A central axis of the housing runs for example in the direction in which the communication signals leave the sending/receiving unit and extends centrally through the housing, i.e. in the centre with respect to the left-right extent of the housing (the left-right extent is defined as the direction towards the elevation axis and away from it). With respect to this central axis, the elevation bearing is arranged eccentrically on the housing of the sending/receiving unit.

The elevation bearing is for example arranged in a corner of the housing. Other possible positions of the elevation bearing are described further below. In this embodiment, the elevation axis is arranged eccentrically with respect to the central axis of the housing.

In a further embodiment, the azimuth drive has a supporting area, with which the elevation drive and the sending/receiving unit are coupled, the azimuth drive being designed to turn the supporting area about the azimuth axis during the turning movement.

The supporting area may be referred to as a turntable, against or on which the elevation drive and/or the sending/receiving unit are arranged and to which they are connected. The azimuth drive turns the supporting area about the azimuth axis. The elevation drive and the sending/receiving unit are thereby set in the same turning movement about the azimuth axis.

The elevation drive and the sending/receiving unit are respectively connected either directly or indirectly to the supporting area. For example, the elevation drive may be connected directly to the supporting area and the sending/receiving unit is for its part connected directly to the elevation drive, whereby the sending/receiving unit is connected indirectly to the supporting area. In any case, a turning movement of the supporting area results in a corresponding movement of the elevation drive and of the sending/receiving unit about the azimuth axis.

Preferably, the supporting area defines the outer circumference of the azimuth drive, i.e. the components of the azimuth drive are located under the supporting area and do not protrude laterally beyond the outer periphery of the supporting area.

The supporting area may for example be circular. Consequently, the sending/receiving unit can also be turned about the azimuth axis when the sending/receiving unit has been swiveled to such an extent about the elevation axis that the sending/receiving unit is placed partially laterally alongside the supporting area. In the case of a circular supporting area, the sending/receiving unit can be turned by 360° about the azimuth axis without bumping into the supporting area. It is however also conceivable that only a region of the supporting area forms an arc of a circle, for example of 270°. Then, the turning movement of the sending/receiving unit about the azimuth axis is restricted to the said 270° of the arc of the circle of the supporting area when the sending/receiving unit has been swiveled about the elevation axis to alongside the supporting area.

In a further embodiment, the lateral offset between the elevation axis and the azimuth axis is equal to or greater than half the distance from the azimuth axis to an outer periphery of the supporting area.

In the case of a circular supporting area and if the azimuth axis runs through the central point of the supporting area, the lateral offset between the elevation axis and the azimuth axis is half the radius of the supporting area. For the case where the supporting area is not circular, the lateral offset between the elevation axis and the azimuth axis is at least half the distance from the central point of the supporting area to the point furthest away from the central point on the outer periphery of the supporting area.

Not every lateral offset between the elevation axis and the azimuth axis necessarily makes it possible that the sending/receiving unit can be swiveled to completely alongside the supporting area. However, this may also not be required in all applications, and it may occasionally be sufficient, depending on the requirements, if the sending/receiving unit can be swiveled partially around the supporting area or to alongside the supporting area, so that a swiveling range of greater than 90° is made possible.

In a further embodiment, the elevation axis is laterally offset from the azimuth axis to such an extent that the elevation axis is arranged laterally outside the supporting area.

In this embodiment, the elevation axis lies laterally outside the supporting area. Depending on in which position the elevation bearing is connected to the housing of the sending/receiving unit, the sending/receiving unit can in this way be swiveled to completely alongside the azimuth drive and the associated turntable.

In a further embodiment, the communication unit also has a processing unit for processing communication signals, the processing unit being connected to the sending/receiving unit by means of a signal transmission medium, so that the communication signals to be transmitted and/or received by the sending/receiving unit can be transmitted between the processing unit and the sending/receiving unit.

The processing unit carries out for example steps of signal processing and/or signal conditioning, for example adaptation of the coding, amplification, etc. However, further functions which perform signal processing of the content of the signals to be transmitted or received may also be implemented in the processing unit.

In a further embodiment, the signal transmission medium is designed to transmit communication signals, in particular optical signals, and runs at least partly along the azimuth axis and/or the elevation axis.

The signal transmission medium may be for example a fibre-optic cable. The fibre-optic cable connects the processing unit and the sending/receiving unit. Consequently, the fibre-optic cable must join in a turning movement of the sending/receiving unit about the azimuth axis and a swiveling movement about the elevation axis. The extent of the bending moments acting on the optical fibre is reduced by the fibre-optic cable running along the azimuth axis and/or the elevation axis. The turning movement and swiveling movement in the two axes has the effect that mainly a torsional moment is exerted on the optical fibre at these locations. Fibre-optic cables are typically designed such that torsional moments are accompanied by low mechanical loading of the optical fibre, whereas bending moments put a much greater mechanical load on the optical fibre. Allowance is made for this finding by the fibre-optic cable running along the azimuth axis and/or the elevation axis, and the mechanical loading of the optical fibre during the movement of the sending/receiving unit is kept low.

In a further embodiment, the communication unit also has a holding and locking unit, the holding and locking unit being designed to lock the sending/receiving unit in an initial position, so that the sending/receiving unit is stopped from performing a swiveling movement about the elevation axis and/or a turning movement about the azimuth axis.

The holding and locking unit is advantageously used when the communication unit is used in a satellite and the sending/receiving unit has to be fixed during the launch phase of the satellite on its way into an Earth orbit, in order to avoid uncontrolled movement of the sending/receiving unit that may be caused by the high forces in the launch phase.

The holding and locking unit may be for example a combined bolt-hook mechanism, which connects the sending/receiving unit to the elevation drive, in order to prevent a swiveling movement about the elevation axis, and which additionally locks the azimuth drive, in order to prevent unwanted turning about the azimuth axis. The holding and locking unit may additionally engage in the housing of the optical unit, in order that during the launch phase the sending/receiving unit is not only carried or held by the elevation bearing but is additionally fixed by the holding and locking unit.

The initial position may also be referred to as the starting position or parking position of the sending/receiving unit. The initial position may in particular form a limit of the swiveling movement about the elevation axis in one direction. That is to say that the sending/receiving unit cannot be swiveled in both directions from the initial position, but only in a direction away from the holding and locking unit. This means for example that the sending/receiving unit in the initial position and in the locked state of the holding and locking unit cannot perform a swiveling movement about the elevation bearing, and accordingly no turning moment acts on the elevation bearing, but the elevation bearing at most has to apply supporting forces in order to keep the sending/receiving unit in the initial position. This may contribute to keeping the mechanical loading of the elevation bearing low.

In a further embodiment, in an initial position the sending/receiving unit is aligned such that a radiating direction of the communication signals passes through an inlet/outlet opening of the sending/receiving unit parallel or perpendicular to the azimuth axis.

It may be desired that in the initial position the inlet/outlet opening of the housing of the sending/receiving unit has a specific orientation with respect to the satellite, for example in order to prevent the ingress of foreign particles into the sending/receiving unit during the launch phase of the satellite or to reduce the extent thereof. The elevation bearing may be arranged on the housing of the sending/receiving unit such that in the initial position the inlet/outlet opening is arranged as desired. The radiating direction of the communication signals through the inlet/outlet opening of the housing of the sending/receiving unit may run parallel to the already mentioned central axis of the housing.

According to a further aspect, a communication satellite which has a communication unit as described herein is provided.

The communication unit may be advantageously used as a sender and/or receiver of electromagnetic or optical communication signals in a communication satellite. The sending/receiving unit is turned about the azimuth axis and/or is swiveled about the elevation axis, in order to align the sending/receiving unit with a remote station, in order that a communication signal can be sent to the remote station or received from it.

The construction described here of the communication unit makes good tracking and aligning of the sending/receiving unit with respect to the remote station possible, because a great swiveling range about the elevation axis and a great turning range about the azimuth axis are made possible, and at the same time a small number of components and a simple mechanical construction are used.

A communication satellite is understood here as meaning a spacecraft which at least for a time moves over the Earth's surface or is in an Earth orbit or is intended for being used over the Earth's surface or in an Earth orbit, this spacecraft having on board a communication device which makes possible the signal exchange with a remote station on Earth or above the Earth's surface, for example on board another communication satellite or aircraft or spacecraft. The term communication satellite is therefore functionally defined in the sense that it is a spacecraft which has on board a communication device for the exchange of communication signals. Preferably, the communication satellite is designed to be used in an Earth orbit and passes around the Earth on a predetermined orbit for a relatively long time period of several years. During the movement of the communication satellite on its orbit, the sending/receiving unit of the communication unit can be aligned with a remote station and the remote station can be tracked. The construction of the communication unit makes a great swiveling range possible in spite of a simple mechanical construction and accompanying low weight.

BRIEF DESCRIPTION OF THE DRAWINGS

Exemplary embodiments are discussed in greater detail below with reference to the appended drawings. The illustrations are schematic and not to scale. The same reference numerals refer to elements which are identical or similar. In the figures.

DETAILED DESCRIPTION

The examples in the figures are described with reference to an optical communication unit 100 with an optical unit 110. The principles set out here also apply however to other sending/receiving units that generally use electromagnetic signals for signal transmission and are not confined to optical units.

Figure 1:
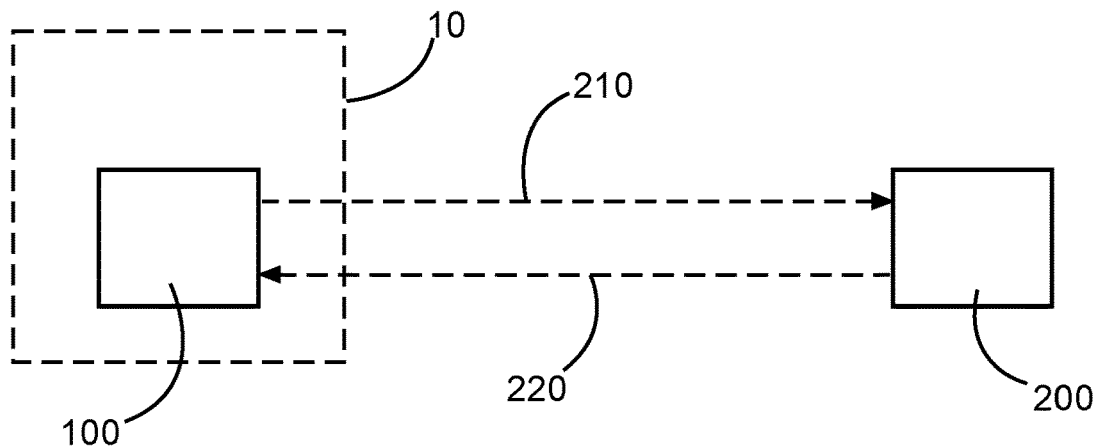
FIG. 1 shows a schematic representation of a communication satellite and a remote station according to an exemplary embodiment.

FIG. 1 shows a schematic representation of an optical communication unit 100 and a remote station 200. The optical communication unit 100 and the remote station 200 represent end points of a communication link. Between these two end points, communication signals 210, 220 can be transmitted in a cableless manner. The communication signals are for example transmitted by way of a channel, the dashed arrows that are pointing in both directions between the optical communication unit 100 and the remote station 200 being intended to symbolize a bidirectional data exchange. In connection with the optical communication unit 100 and the remote station 200 described here, a person skilled in the art can revert to all of the known transmission methods. In the example described here, the communication signals 210, 220 are transmitted between the optical communication unit 100 and the remote station 200 in a cableless and optical manner.

The optical communication unit 100 is arranged on board a satellite 10 and is designed to communicate with a remote station 200, which is arranged (in a static or mobile manner) in another aircraft or spacecraft or on the Earth's surface.

The configuration shown in FIG. 1 may also be referred to as a communication system. The remote station may be designed in any way known to a person skilled in the art. While the satellite 10 is following its predetermined orbit around the Earth, the optical unit of the optical communication unit may be aligned with the remote station 200 according to the principles described here and maintain this alignment in order to make possible an exchange of optical communication signals 210, 220 between the optical communication unit and the remote station.

Figure 2:
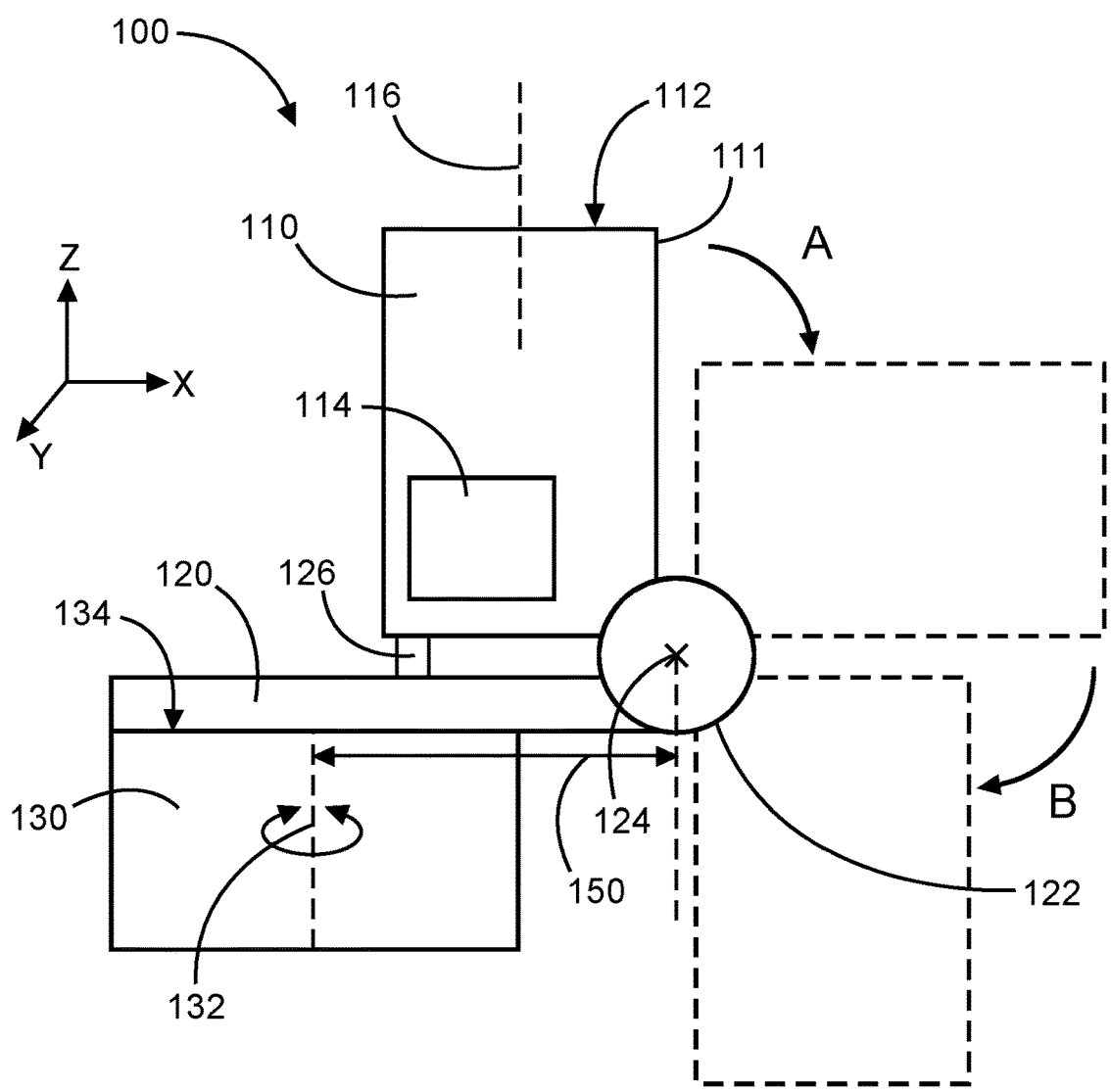
FIG. 2 shows a schematic representation of an optical communication unit according to an exemplary embodiment in a side view.

FIG. 2 shows a schematic representation of an optical communication unit 100. The optical communication unit 100 has in this example an optical unit 110, an elevation drive 120 and an azimuth drive 130.

The optical unit 110 has a housing 111 with an inlet/outlet opening 112 and optical components 114 arranged in the housing 111. The optical components 114 are for example customary components used in optical data transmission, which emit an optical signal in the direction of a remote station and/or receive an optical signal sent out from a remote station.

The optical unit 110 is coupled with an elevation bearing 122, which makes it possible that the optical unit 110 can be swiveled about an elevation axis 124. The elevation axis 124 runs along the Y axis. The swiveling movement about the elevation axis 124 is schematically indicated by positions of the optical unit 110 shown in various positions and after swiveling movements A and B by 90° in each case, the optical unit 110 being respectively depicted in these positions by dashed lines.

In the initial position of the optical unit 110, the opening 112 is facing upwards. After the swiveling movement A by 90° in the clockwise direction, the opening 112 is facing to the right and, after the further swiveling movement B by 90° in the clockwise direction, the opening 112 is facing downwards. Consequently, the optical communication unit 100 described herein can make possible a great angular range for the swiveling movement about the elevation axis 124. In the example shown in FIG. 2, the optical unit 110 is distinguished by an angular range of 180° for the swiveling movement about the elevation axis 124.

The optical unit 110 may however also be connected to the elevation bearing 122 such that in the initial position the opening 112 is facing in the direction of the elevation drive 120. Such a construction can contribute to protecting the opening 112 and the optical components 114 from the ingress of foreign particles.

In the initial position, the optical unit 110 lies on a holding and locking unit 126 or is mechanically coupled with it. Consequently, in the initial position the optical unit 110 is held not only by the elevation bearing 122 but also by the holding and locking unit 126. The holding and locking unit 126 may for example engage in the housing 111 of the optical unit 110, in order that the optical unit 110 is fixedly connected to the holding and locking unit 126 and is kept in the initial position even when external forces act, for example in the launch phase of the satellite in which the optical communication unit 100 is installed. In the initial position, a central axis 116 or optical axis (the direction in which optical signals are emitted or received) runs parallel to the Z axis.

The elevation drive 120 is connected to the elevation bearing 122, so that the elevation drive 120 can transfer a force to the optical unit 110, in order to swivel the optical unit 110 about the elevation axis 124.

For a space-saving construction, the optical unit 110 is mounted on the elevation drive 120. The elevation drive 120 for its part is mounted on a supporting area 134 of the azimuth drive 130. The azimuth drive 130 is designed to perform a rotational movement about the azimuth axis 132, the azimuth axis 132 running parallel to the Z axis. In the case of a turning movement about the azimuth axis 132, the supporting area 134 also turns correspondingly and transfers this turning movement to the optical unit 110.

As shown in FIG. 2, the elevation axis 124 is offset from the azimuth axis 132 by a lateral offset 150. When the optical unit 110 is swiveled from the initial position in the clockwise direction about the elevation axis 124, this swiveling movement can cover an angle greater than 90°. Even when the optical unit 110 has been at least partially swiveled laterally to alongside the supporting area 134 of the azimuth drive 130 (that is to say into a position of which the swiveling angle is greater than the angle in position A, that is to say 90°, from the initial position, and is less than or equal to the swiveling angle in position B, that is to say 180°, from the initial position), a turning movement can still be performed about the azimuth axis 132.

As can be seen from FIG. 2, the construction described here of the optical communication unit serves for the flexible and compact design of optical sending and receiving units for satellites, in particular of satellites that can be advantageously used in satellite constellations.

The unusual design of the turning (turning movement about the azimuth axis) and tilting mechanisms (swiveling movement about the elevation axis) makes possible a turning range about the Z axis of up to 360° and a tilting range about the X axis or Y axis of up to 180° from its initial position. The upright position of the optical unit 110 in the initial position has the effect of ensuring optimal load introduction of the launch loads, which makes the optical communication unit 100 described here usable for a large number of mission profiles. The optical communication unit is distinguished in particular by the eccentric suspension of the elevation bearing. The positioning of the elevation bearing at a distance of more than half the radius of the supporting area 138 with respect to the azimuth axis makes great flexibility possible and—in interaction with the holding and locking unit 126—offers good introduction of the launch loads into the structure, with at the same time a high deflection angle of the optical unit. The great tilting and turning range makes a similarly great effective field of view possible (angular range in which an optical link with a remote station can be set up), with at the same time a compact type of construction.

Figure 3:
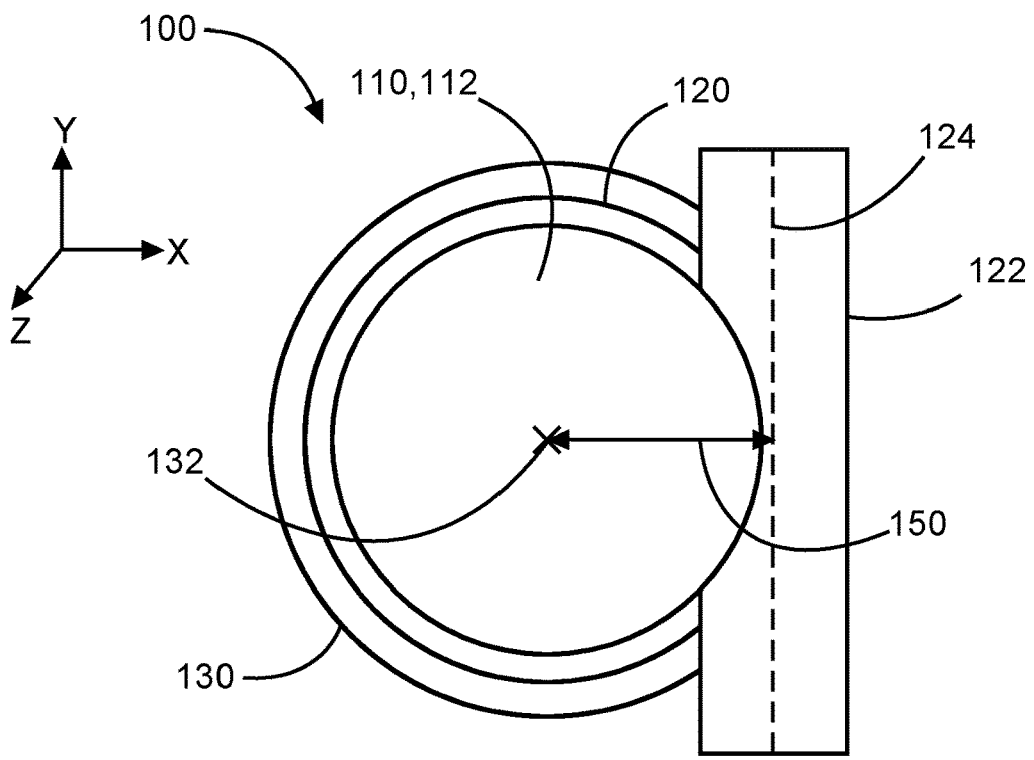
FIG. 3 shows a schematic representation of an optical communication unit according to an exemplary embodiment in a plan view.

FIG. 3 shows a plan view of the optical communication unit 100 with the optical unit 110 in the initial position. In the plan view of the optical communication unit 100, the inlet/outlet opening 112 of the housing of the optical unit 110 is shown in the middle. The opening 112 may have a diameter which is less than the diameter of the housing of the optical unit, but the opening 112 may also extend over an entire end face of the housing of the optical unit. Even if the housing of the optical unit is shown here as circular, the housing of the optical unit may also have different forms. When the optical unit is swiveled out of the initial position about the elevation axis 124, the optical unit moves to the right in FIG. 3. The elevation bearing 126 is fastened to the elevation drive 120. The elevation drive 120 in turn lies on the azimuth drive 130. When the azimuth drive 130 performs a turning movement about the azimuth axis 132, the elevation drive 120, the elevation bearing 122 and the optical unit 110 join in this turning movement. The turning movement can also be performed when the optical unit 110 is not in the initial position, but has been swiveled to alongside the azimuth drive 130. The reason for this is that the elevation axis 124 is offset from the azimuth axis 132 by a lateral offset 150.

Figure 4:
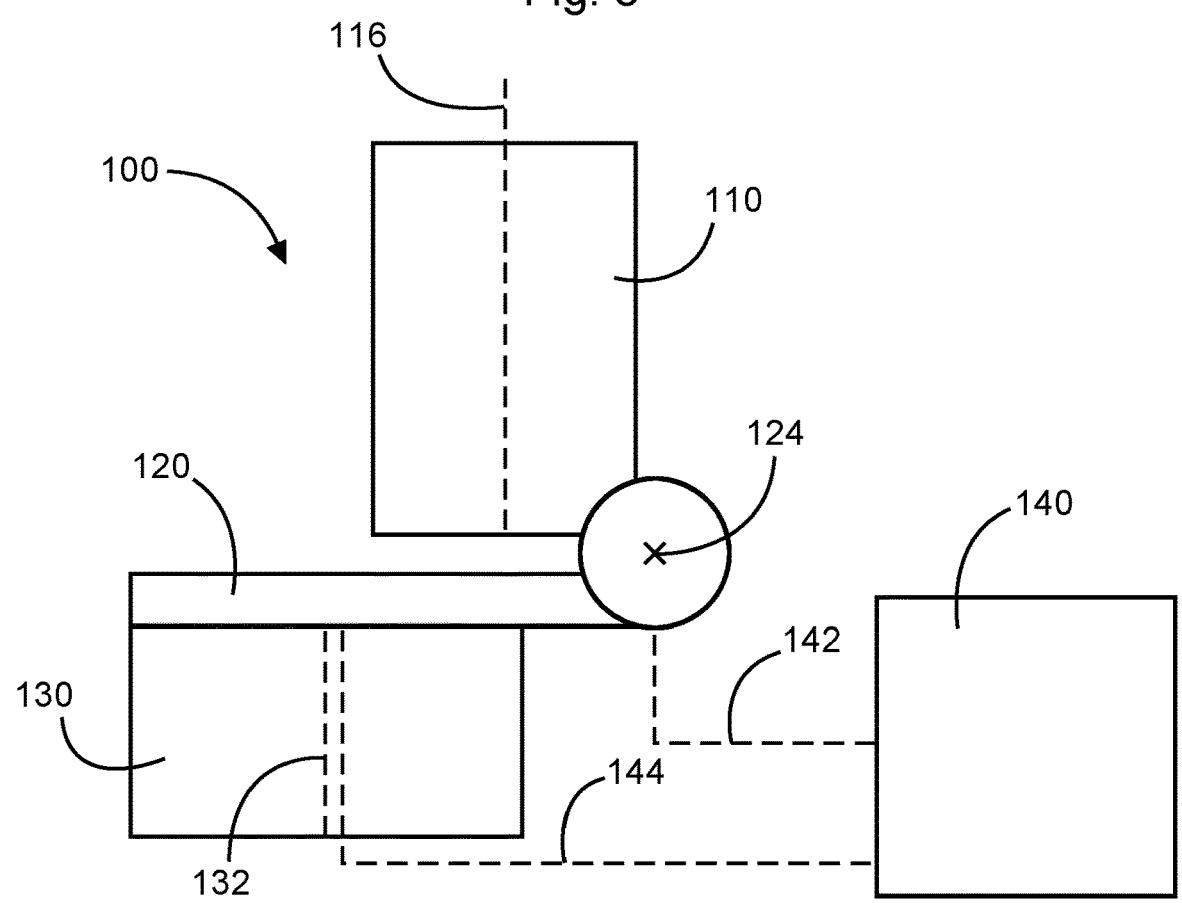
FIG. 4 shows a schematic representation of an optical communication unit according to an exemplary embodiment in a side view.

FIG. 4 shows a further schematic representation of the optical communication unit 100 with the components already shown in FIG. 1 and described with reference hereto. The components already shown in FIG. 1 are not discussed again here.

The optical communication unit 100 also has in this example a processing unit 140, which is connected to the optical unit 110 by a first signal transmission medium 142 and a second signal transmission medium 144. The processing unit 140 may have for example processors, microcontrollers and other electronic components, which perform functions of signal processing, signal conditioning and/or signal amplification. The signal transmission media 142, 144 are for example optical transmission media or optical fibres. Preferably, the signal transmission media 142, 144 are guided to the optical unit 110 along the azimuth axis 132 or the elevation axis 124. As a result, the mechanical loading on the signal transmission media during the turning and swiveling movement of the optical unit 110 is kept low.

Figure 5:
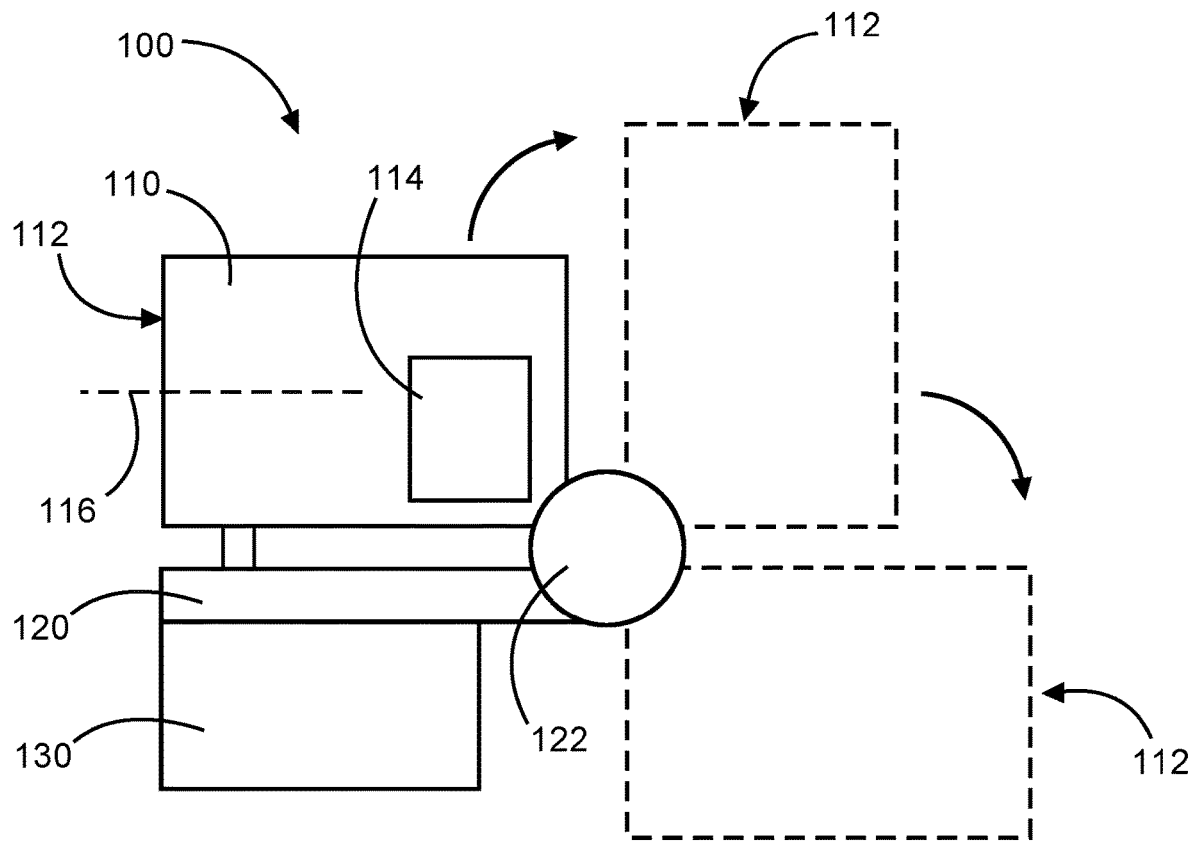
FIG. 5 shows a schematic representation of an optical communication unit according to an exemplary embodiment in a side view.

FIG. 5 shows an alternative construction of an optical communication unit 100, the orientation of the optical unit 110 in the initial position differing from the orientation of the optical unit 110 from FIG. 2. Reference is also made to the previous figures for the description of the further components.

In FIG. 5, the central axis or optical axis 116 of the optical unit 110 has been turned by 90° in comparison with the example from FIG. 2 and, in the coordinate system of FIG. 2, runs parallel to the X axis. Also in the example of FIG. 5, a swiveling range of the optical unit 110 of up to 180° is possible, depending on the positioning of the elevation bearing 122. In the initial position, the housing 111 of the optical unit lies with a side area on the holding and locking unit 126, whereas the optical unit 110 in FIG. 2 lies with a base area on the holding and locking unit, and is coupled or locked with it.

The example in FIG. 5 has the advantage that in the initial position the optical communication unit 100 takes up less space. Also, the different orientation of the optical unit in the initial position allows the opening 112 in the housing 111 to be positioned such that fewer foreign particles can get into the opening 112 during a launch phase of the satellite. This can contribute to less impairment of the emitted or received optical signals.

Figure 6:
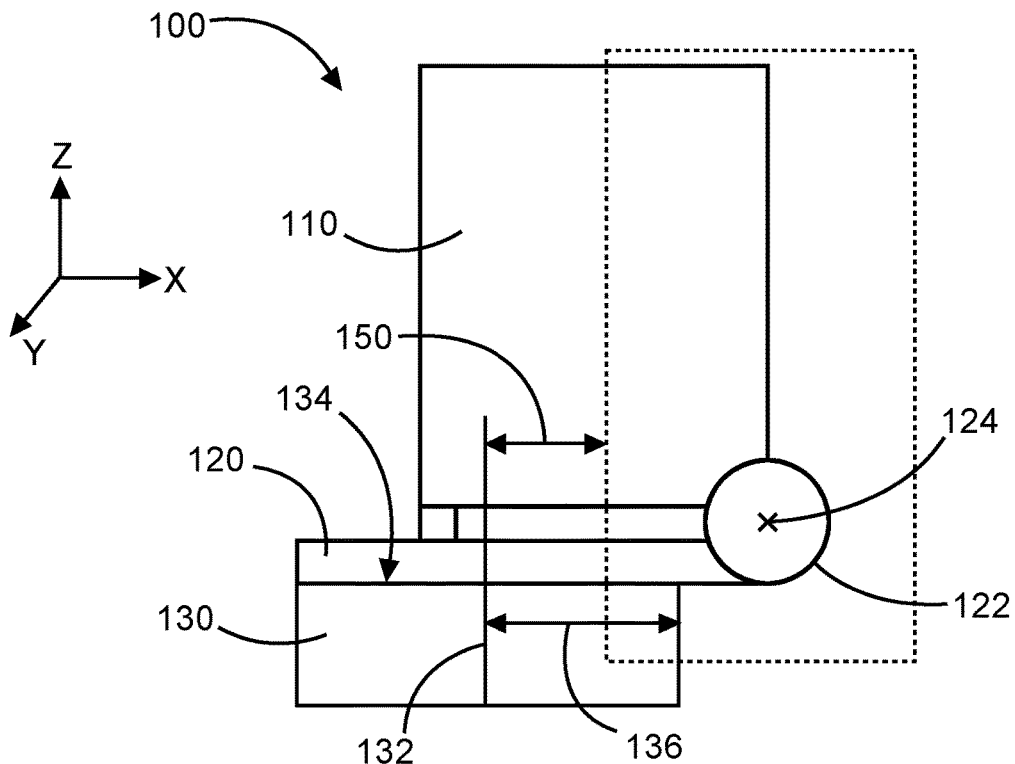
FIG. 6 shows a schematic representation of an optical communication unit according to an exemplary embodiment in a side view.

FIG. 6 shows an optical communication unit 100, the possible advantageous positions of the elevation bearing being indicated in this representation. The elevation bearing 122 has initially a lateral offset 150 in relation to the azimuth axis 132. In an advantageous example, this lateral offset 150 (distance along the X axis) is greater than or equal to half the radius 136 of the supporting area 134. The elevation bearing 122 may be laterally offset to such an extent that it partially or completely protrudes laterally beyond the supporting area 134. In the representation of FIG. 6, the elevation bearing 122 is connected to the right-hand lower corner of the housing of the optical unit. However, this is not the only possible position to connect the elevation bearing to the housing of the optical unit. Rather, the elevation bearing may be connected to the housing along the Z axis over the entire extent of the housing.

As a result of the compact type of construction described herein of the optical communication unit 100, the number of subassemblies is considerably reduced, which is reflected in a clear saving of mass and cost. For example, it dispenses with swivellable mirrors arranged outside the optical unit, because the entire optical unit 110 can be turned and swiveled. Nevertheless, a great swiveling range about the elevation axis of up to 180° and a turning range about the azimuth axis of up to 360° are made possible.

In addition, it should be noted that "comprising" or "having" does not rule out any other elements or steps, and "a" or "an" does not rule out a multiplicity. Furthermore, it should be noted that features or steps which have been described with reference to one of the above exemplary embodiments can also be used in combination with other features or steps of other embodiments described above. Reference numerals in the claims should not be considered restrictive.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE NUMERALS

10 Satellite
100 Communication unit
110 Sending/receiving unit
111 Housing
112 Inlet/outlet opening
114 Optical components
116 Central axis
120 Elevation drive
122 Elevation bearing
124 Elevation axis, rotation axis (parallel to Y axis)
126 Holding and locking unit
130 Azimuth drive
132 Azimuth axis, rotation axis (parallel to Z axis)
134 Supporting area
136 Radius of the supporting area
140 Processing unit
142 First signal transmission medium
144 Second signal transmission medium
150 Lateral offset
200 Remote station
210 Communication signal
220 Communication signal

The invention claimed is:

1. A communication unit for sending and receiving communication signals, comprising:
   a sending/receiving unit configured to emit and/or to receive communication signals;
   an elevation drive coupled with the sending/receiving unit by way of an elevation bearing and configured to swivel the sending/receiving unit about an elevation axis of the elevation bearing;
   an azimuth drive coupled with the sending/receiving unit and the elevation drive and configured to turn the sending/receiving unit together with the elevation drive about an azimuth axis;
   wherein the elevation axis is arranged eccentrically with respect to the azimuth axis, so that the elevation axis is offset in relation to the azimuth axis by a lateral offset,
   wherein the azimuth drive has a supporting area, with which the elevation drive and the sending/receiving unit are coupled;
   wherein the azimuth drive is configured to turn the supporting area about the azimuth axis during the turning movement, and
   wherein the elevation axis is laterally offset from the azimuth axis to such an extent that the elevation axis is arranged laterally outside the supporting area.

2. The communication unit according to claim 1, wherein the elevation bearing is connected to a housing of the sending/receiving unit and the elevation axis is arranged eccentrically with respect to a central axis of the housing.

3. The communication unit according to claim 1, further comprising a processing unit for processing communication signals;
   wherein the processing unit is connected to the sending/receiving unit by a signal transmission medium, so that the signals to be transmitted and/or received by the sending/receiving unit can be transmitted between the processing unit and the sending/receiving unit.

4. The communication unit according to claim 3, wherein the signal transmission medium is configured to transmit signals and runs at least partly along the azimuth axis and/or the elevation axis.

5. The communication unit according to claim 1, further comprising a holding and locking unit;
   wherein the holding and locking unit is configured to lock the sending/receiving unit in an initial position, so that the sending/receiving unit is stopped from performing a swivelling movement about the elevation axis and/or
a turning movement about the azimuth axis.

6. The communication unit according to claim 1, wherein, in an initial position the sending/receiving unit is aligned such that a radiating direction of optical signals passes through an inlet/outlet opening of the unit parallel or perpendicular to the azimuth axis.

7. The communication unit according to claim 1,
wherein the communication unit is an optical communication unit; and
wherein the sending/receiving unit is an optical unit.

8. The communication satellite, comprising a communication unit according to claim 1.

* * * * *